June 17, 1941.                F. L. MAIN                    2,246,140
                           HYDRAULIC BRAKE
                      Filed April 11, 1938           2 Sheets-Sheet 2
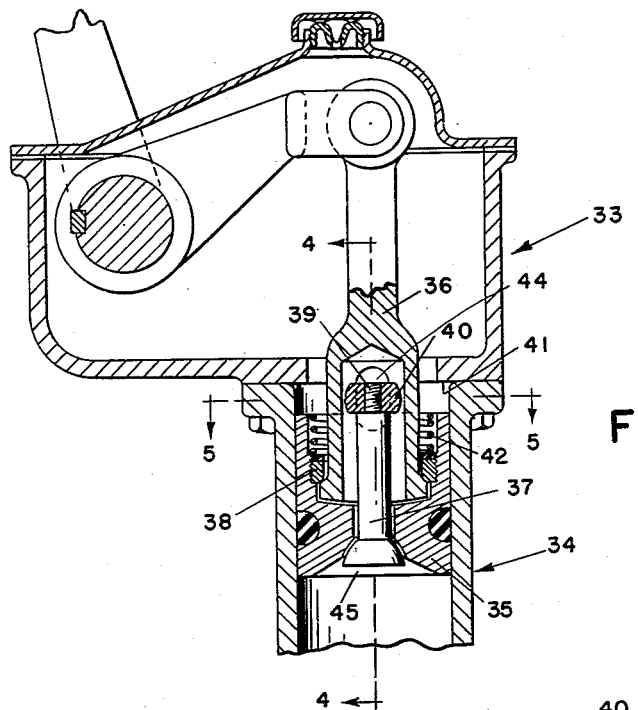
FIG. 3.
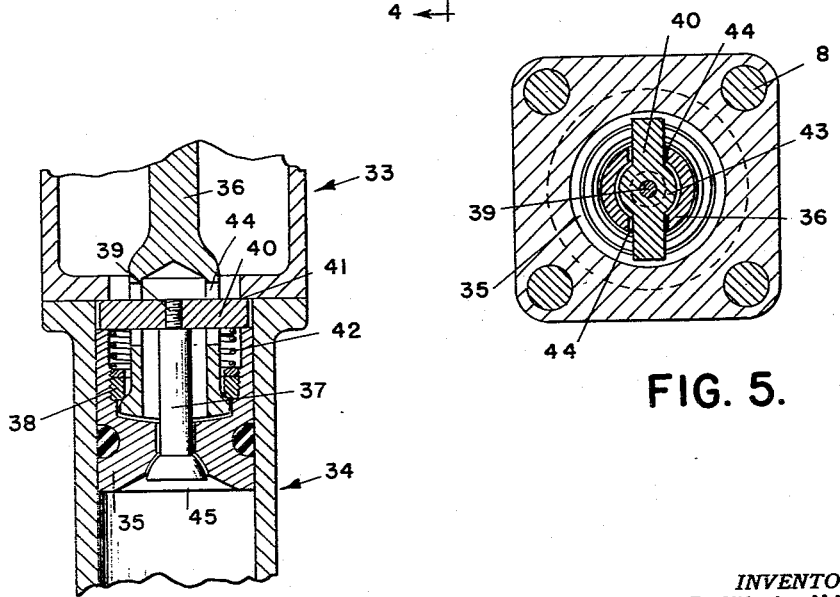
FIG. 4.                                              FIG. 5.
INVENTOR
FRANK L. MAIN
ATTORNEYS Patented June 17, 1941

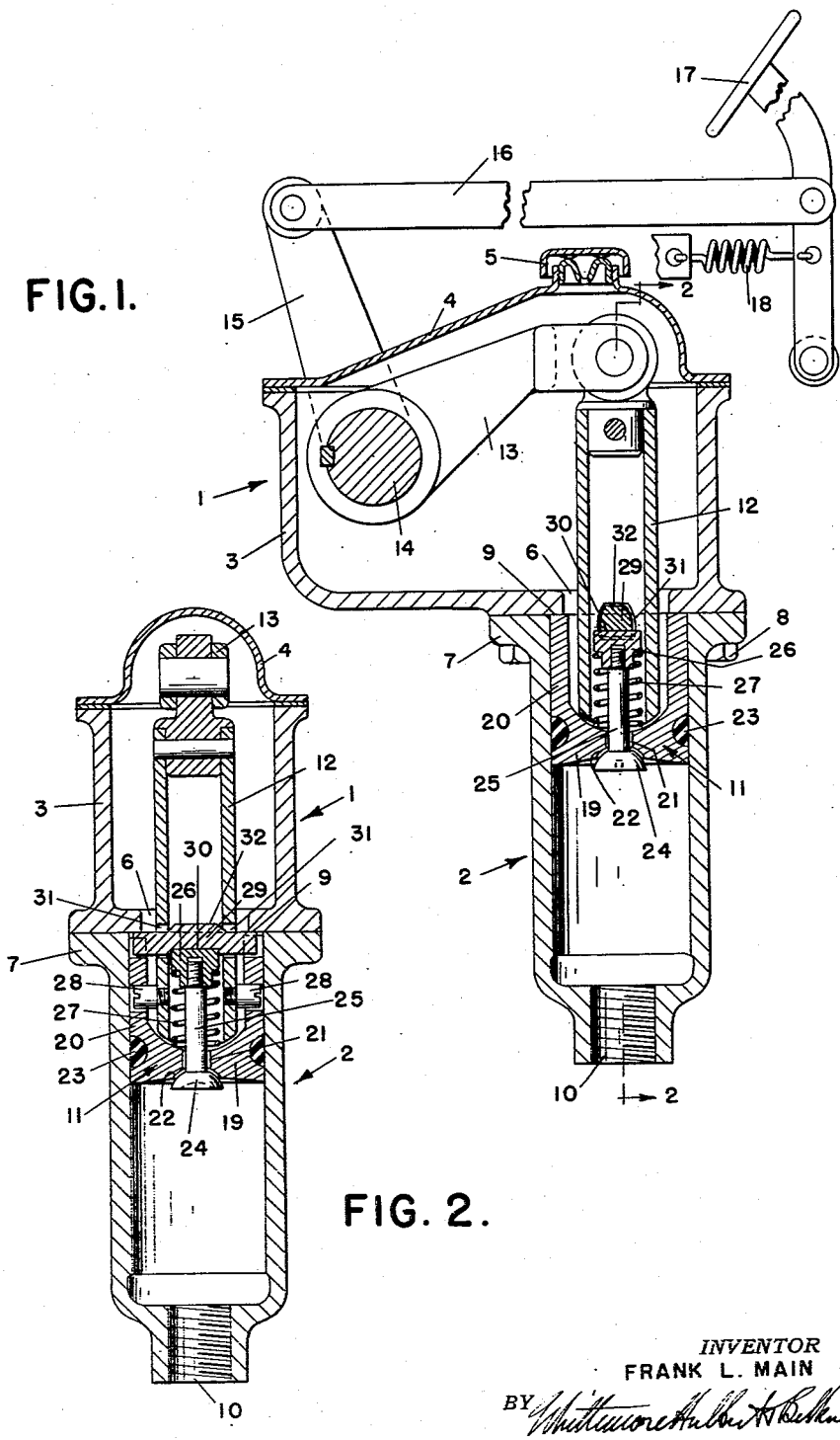

2,246,140

UNITED STATES PATENT OFFICE 2,246,140

HYDRAULIC BRAKE

Frank L. Main, Birmingham, Mich., assignor to Kelsey-Hayes Wheel Company, Detroit, Mich., a corporation of Delaware Application April 11, 1938, Serial No. 201,403

12 Claims. (Cl. 60—54.6)

The invention relates to hydraulic brakes and refers more particularly to master cylinders adapted for use with fluid brake systems of motor vehicles.

The invention has for an object to provide an improved construction of master cylinder of that type in which the piston is provided with a port adapted to be controlled by a valve. The invention has for further objects to so construct the master cylinder that a relatively short piston may be used without danger of the piston binding in the cylinder; to so construct the master cylinder that the connecting rod does not interfere with the operation of the valve; and to so construct the piston that air or other gas may escape from the system even when the master cylinder is inclined at an angle.

The invention has for further objects the novel arrangements and combinations of parts as more fully hereinafter set forth.

In the drawings:

Figure 1 is a vertical central section through a master cylinder showing an embodiment of my invention;

Figure 2 is a cross section on the line 2—2 of Figure 1;

Figure 3 is a view similar to Figure 1 showing another embodiment of my invention;

Figures 4 and 5 are cross sections on the lines 4—4 and 5—5 respectively of Figure 3.

Referring to the master cylinder shown in Figures 1 and 2, 1 is the reservoir element and 2 the cylinder element. The reservoir element has the hollow body 3 which is formed with an open upper end and the cover 4 which is provided with a suitable breather 5 for the passage of air to and from the reservoir. The reservoir element has in its bottom wall the hole 6. The cylinder element has the annular flange 7 through which the cylinder element is secured against the bottom wall of the reservoir body by suitable means such as the bolts 8. The cylinder element is secured in axial alignment with the hole 6 and the bore of the cylinder element is of greater diameter than the hole to form the annular shoulder 9 upon the bottom wall of the reservoir body at the upper end of the cylinder element. The cylinder element has at its opposite or lower end the port 10 through which the braking liquid may pass to the wheel cylinders through suitable tubing.

11 is the piston reciprocable within the bore of the cylinder element. 12 is the connecting rod and 13 the lever pivotally connected to the upper end of the connecting rod. This lever is located within the reservoir and mounted upon the shaft 14 which extends transversely through the side walls of the reservoir body 3. One end of the shaft outside the reservoir has secured thereto the lever 15 which is connected by the rod 16 to the foot pedal 17. 18 is a spring connected to the foot pedal for normally holding the same in its off position, which is determined by the shoulder 9 of the reservoir body serving as a stop for the upper end of the piston 11.

The piston 11 has the relatively thin head 19 and the skirt 20 extending upwardly therefrom. The head is provided with the axial port 21 having the spherical seat 22 at the pressure end of the piston. The piston is also provided with the packing means 23 which is preferably in the nature of a rubber ring. 24 is a valve engageable with the seat 22 and having the stem 25 which extends upwardly through the port 21 and beyond the head 19. The upper end of this valve stem is reduced and threadedly engages the block 26. The valve is normally held in closed position by means of the coil spring 27 which encircles the valve stem and abuts the upper face of the head and the lower face of the block. The head of the valve is preferably slotted to facilitate the assembly of the valve with the block.

The connecting rod 12 is hollow or tubular and it is pivotally connected to the piston 11 by means of the diametrically opposite axially aligned trunnions 28 which have inner portions threadedly engaging diametrically opposite portions of the connecting rod and outer portions journaled in the skirt 20 of the piston. The lower end of the connecting rod is spherical and adapted to slidably engage the upper face of the head which is correspondingly shaped. The lower face of the connecting rod has its center of curvature at the point of intersection of the axis of the piston and the axes of the trunnions. The openings in which the trunnions are journaled are of slightly greater diameter than the portions of the trunnions engaging the same to provide for lost motion so that the lower end of the connecting rod may engage the upper face of the piston head during the pressure stroke of the piston thereby relieving the trunnions of load. However, upon retractile movement of the piston the connecting rod acts through the trunnions to retract the piston. It will be noted that the connecting rod is of a diameter to freely encircle the coil spring 27 and the block 26 so that it will not interfere during the operation with the operation of the valve.

For the purpose of moving the valve to open position during the final portion of the retractile movement of the piston, I have provided the bar 29 which extends transversely through the connecting rod and has in its bottom the recess or slot 30 for receiving the block 26. The end portions of this bar extend into the diametrically opposite slots 31 at the upper end of the piston skirt 20 and during the retractile movement of the piston are engageable with the stop shoulder 9 prior to engagement of the upper end of the piston skirt with this stop shoulder. As a result, it will be seen that during the final portion of the retractile movement of the piston the valve will be held stationary while the piston continues its retractile movement and, as a result, the valve will be moved to open position so that the braking liquid may pass from the reservoir downwardly into the portion of the piston element bore at the pressure end of the piston. Also air or other gas in the system beyond the pressure end of the piston may pass upwardly through the piston and the reservoir and outwardly through the breather. It will be noted that the opening of the valve is accomplished without subjecting the threads of its upper end portion to work.

To position the cross bar 29, the central portion 32 of its top is raised to provide shoulders engageable with the diametrically opposite portions of the connecting rod. The slots through the connecting rod for the cross bar are sufficiently long to provide for assembly of the cross bar with the connecting rod and at the same time to provide for the necessary relative movement of the connecting rod and cross bar.

The master cylinder illustrated in Figures 3, 4 and 5 comprises the reservoir element 33 and the cylinder element 34 which are substantially like the corresponding elements of the previously described modification. The piston 35 is adapted to be reciprocated within the bore of the cylinder element by the connecting rod 36, the upper end of which is pivotally connected to a lever constructed and also adapted to be operated in substantially the same manner as the corresponding lever of the above described modification.

The connecting rod instead of being tubular throughout its extent has its lower end portion only hollow or tubular to provide a bore for freely receiving the valve stem 37. The lower end of the connecting rod is upset and spherical shaped to slidably engage the correspondingly shaped upper face of the head of the piston and the center of curvature is at the point of intersection of the axis of the connecting rod and the axis of its pivotal connection to its operating lever. For loosely connecting the connecting rod to the piston there is the nut 38 threadedly engaging the piston skirt and adapted to engage the upper surface or shoulder of the upset lower end of the connecting rod. The valve stem 37 terminates in its upper end in the reduced externally threaded portion 39 which is threaded directly into the cross bar 40. This cross bar extends transversely through the tubular lower end portion of the connecting rod and into diametrically opposite slots in the piston skirt and is adapted to engage the annular stop shoulder 41 formed upon the bottom wall of the reservoir body. The valve is normally held in closed position by the coil spring 42 which encircles the connecting rod inside the piston skirt and abuts the nut 38 and the cross bar 40. During the final portion of the retractile movement of the piston the cross bar 40 will abut the annular stop shoulder 41, holding the valve 37 stationary while the piston continues its retractile movement, thereby opening the valve and establishing communication between the cylinder and the reservoir.

For the purpose of locating the cross bar, its middle portion is provided in effect with the hub 43 within the bore of the lower end portion of the connecting rod and providing sufficient clearance to permit the necessary angular movement of the connecting rod without interfering with or displacing the cross bar and the valve connected thereto. The slots 44 in the lower end portion of the connecting rod are sufficiently long to permit assembly of the cross bar with the connecting rod and at the same time provide for the required relative movement of the connecting rod and cross bar during the final portion of the retractile movement of the piston. To provide for the escape of air or other gas from the system beyond the pressure end of the piston, even when the master cylinder is inclined at an angle, the pressure end of the piston is provided with the recess 45, the side wall of which tapers inwardly and upwardly toward the axis of the piston.

It will be noted from the above description that my master cylinder is so constructed that the valve may be positively opened during the final portion of the retractile movement of the piston and that while the connecting rod may move angularly relative to the piston it is independent of the mounting of the valve on the piston and does not interfere with the operation of the valve. Furthermore, by reason of the connecting rod engaging the piston in a zone adjacent its pressure end and also near the axis of the piston a short piston can be used without danger of binding during the pressure stroke.

What I claim as my invention is:

1. A master cylinder comprising a reservoir, a cylinder, a piston within said cylinder provided with a port for placing the portion of said cylinder at the pressure end of said piston in communication with said reservoir, a connecting rod having a hollow portion angularly movably connected to said piston, a valve for said port at the pressure end of said piston having a stem extending through said port and freely within said connecting rod hollow portion, a bar extending transversely through said connecting rod hollow portion, and fixed means adapted to be engaged by said bar during the final portion of the retractile movement of said piston to open said valve through said stem.

2. A master cylinder comprising a reservoir, a cylinder, a piston within said cylinder provided with an axial port for placing the portion of said cylinder at the pressure end of said piston in communication with said reservoir, a stop for said piston, a connecting rod having a hollow portion angularly slidably engaging said piston to advance the same, a valve for said port at the pressure end of said piston having a stem extending through said port and within said hollow portion, a spring encircling said stem and located within said hollow portion for urging said valve toward closed position, and means including a bar extending through said hollow portion and engageable with said stop to unseat said valve when the piston is in its retracted position.

3. A master cylinder comprising a reservoir, a cylinder, a piston within said cylinder provided with an axial port for placing the portion of said cylinder at the pressure end of said piston in communication with said reservoir, a connecting rod having a hollow portion angularly slidably engaging said piston to advance the same, a valve for said port at the pressure end of said piston having a stem extending through said port and within said hollow portion, a bar extending transversely through said hollow portion, and means engageable with said bar during the final portion of the retractile movement of said piston to move said valve through said stem to open position, and a coil spring encircling said hollow portion for urging said valve through said bar and stem toward closed position.

4. A master cylinder comprising a reservoir, a cylinder, a piston within said cylinder provided with a port for placing the portion of said cylinder at the pressure end of said piston in communication with said reservoir, a connecting rod having a portion extending within said piston and provided with a spherical end for angularly slidably engaging said piston to advance the same, said piston being provided with a cooperating correspondingly shaped bearing face, a valve for said port at the pressure end of said piston, means extending through said connecting rod adapted to operate said valve, and means engageable with said first named means to unseat said valve when the piston is in its retracted position.

5. A master cylinder comprising a reservoir, a cylinder, a piston within said cylinder provided with an axial port for placing the portion of said cylinder at the pressure end of said piston in communication with said reservoir, a valve for said port at the pressure end of said piston, a connecting rod having a hollow portion extending within said piston and terminating in a spherical end slidably engageable with said piston for advancing the same, said piston having a cooperating correspondingly shaped bearing face, diametrically opposite trunnions engageable with said piston and hollow portion, said trunnions having a lost motion connection with one and being positioned so that their axes extend through the center about which said spherical end is formed, means extending transversely through said hollow portion and operatively engaging said valve, and means engageable with said transverse means during the final portion of the retractile movement of said piston to open said valve.

6. A master cylinder comprising a reservoir, a cylinder, a piston within said cylinder provided with an axial port for placing the portion of said cylinder at the pressure end of said piston in communication with said reservoir, a valve for said port at the pressure end of said piston, a lever, a connecting rod pivoted at one end to said lever and having at the opposite end a hollow portion formed with a spherical face slidably engageable with said piston to advance the same, said face being formed about the axis of said pivotal connection between said lever and connecting rod, a nut threadedly engaging said piston for holding said connecting rod from accidental disengagement therefrom, and means extending transversely through said hollow portion adapted to operate said valve, and means engageable with said transverse means during the final portion of the retractile movement of said piston to open said valve.

7. A master cylinder comprising a reservoir having a hole in one wall, a cylinder having a bore in substantial axial alignment with said hole, the bore of said cylinder being of greater diameter than said hole to form an annular shoulder upon the wall of said reservoir at the adjacent end of said cylinder, a piston in said cylinder provided with a port establishing communication between said reservoir and said cylinder, a valve for controlling said port, a bar operatively connected to said valve and engageable with said annular shoulder to unseat said valve when the piston is in its retracted position, and means for operating said piston.

8. A master cylinder comprising a reservoir having a hole in one wall, a cylinder having a bore in substantial axial alignment with said hole, the bore of said cylinder being of greater diameter than said hole to form an annular shoulder upon the wall of said reservoir at the adjacent end of said cylinder, a piston in said cylinder provided with a port establishing communication between said reservoir and said cylinder, a valve having a head at the pressure side of said piston and a stem extending through the port in said piston, a connecting rod having a hollow end portion surrounding said valve stem and being adapted to engage said piston to actuate the latter, and a bar extending transversely through said hollow portion and operatively connected to said valve stem, said bar being engageable with said annular shoulder to unseat said valve when the piston is in its retracted position.

9. A master cylinder comprising a reservoir, a cylinder, a piston within said cylinder provided with an axial port for placing the portion of said cylinder at the pressure side of said piston in communication with said reservoir, a valve for controlling said port having a head at the pressure side of the piston and a stem extending through said port, a connecting rod having a tubular end portion surrounding said valve stem and terminating in an arcuate piston engaging portion adapted to angularly slidably engage said piston to advance the same, and a spring urging said valve toward closed position.

10. A master cylinder comprising a reservoir, a cylinder, a piston within said cylinder having a head provided with an axial port and a tubular skirt extending rearwardly from said head, a valve for controlling said port having a stem extending through said port terminating in an enlarged part at the pressure side of said piston, a stop for limiting the rearward movement of said piston, a connecting rod having a hollow end portion extending within the skirt portion of said piston and angularly slidably engaging said piston on opposite sides of said port to advance said piston, said hollow portion surrounding said valve stem and being provided with diametrically opposite openings, and a bar extending transversely through said diametrically opposite openings and operatively connected to said valve stem, said bar being engageable with said stop to unseat said valve when the piston is in its retracted position.

11. A master cylinder comprising a reservoir, a cylinder, a piston within said cylinder provided with an axial port for placing the portion of the cylinder at the pressure side of the piston in communication with said reservoir, a valve for controlling said port having a head at the pressure side of the piston and a stem extending through said port, an operating shaft extending through a wall of said reservoir, a lever within said reservoir connected to said shaft, a connecting rod having one end pivotally connected to said lever and having a hollow portion at the opposite end extending within said piston, said hollow portion receiving the valve stem and having the end thereof angularly slidably engageable with the pressure end of the piston around the valve stem, the piston engaging end of said connecting rod being arcuate and having as a center of curvature the axis of the pivotal connection of said connecting rod to said lever, said piston being provided with a correspondingly shaped arcuate bearing face, and means responsive to movement of the piston for operating said valve.

12. A master cylinder comprising a reservoir, a cylinder, a piston within said cylinder provided with an axial port for placing the portion of the cylinder at the pressure side of the piston in communication with said reservoir, a valve for controlling said port having a head at the pressure side of the piston and a stem extending through said port, an operating shaft extending through a wall of said reservoir, a lever within said reservoir connected to said shaft, a connecting rod having one end pivotally connected to said lever and having a hollow portion at the opposite end extending within said piston, said hollow end portion of the connecting rod receiving the valve stem and angularly slidably engaging said piston near the pressure end of the latter around the port through said pressure end of the piston, the piston engaging end of said connecting rod being spherical and having as a center of curvature the intersection of the axis of said connecting rod and the axis of the pivotal connection of said connecting rod to said lever, said piston being provided with a correspondingly shaped spherical bearing face, and means responsive to movement of the piston for operating said valve.

FRANK L. MAIN.